Figures 1, 7:
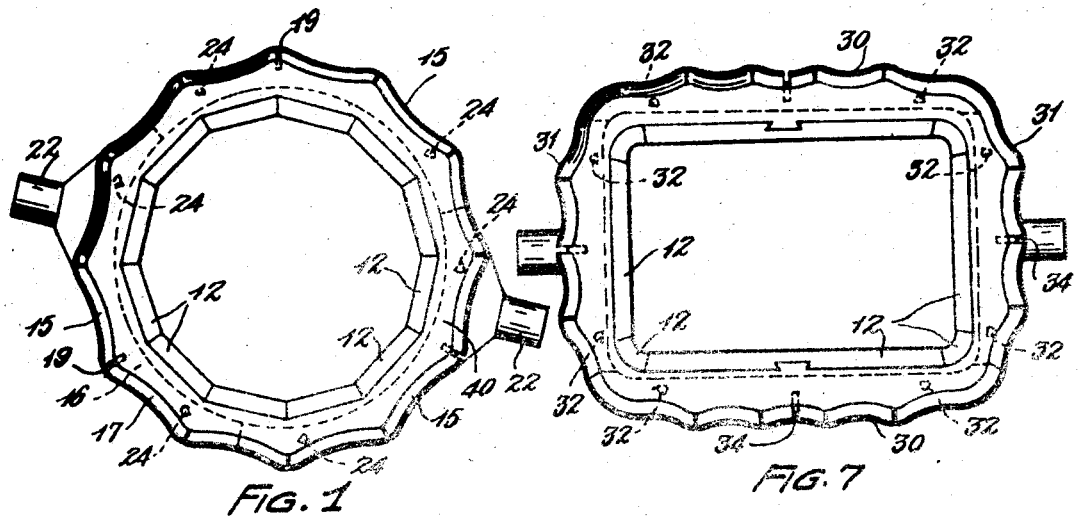
Figure 2:
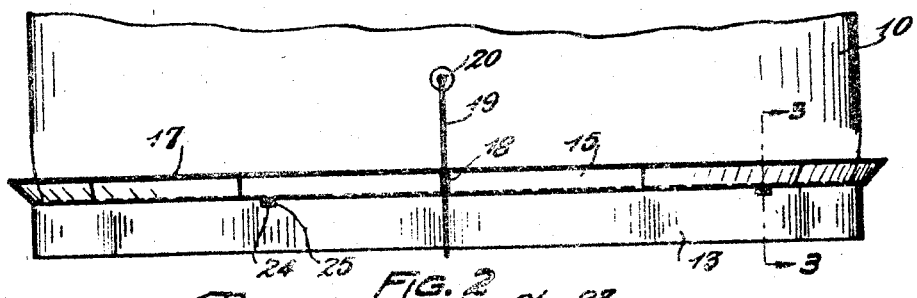
Figures 3, 4, 5, 6:
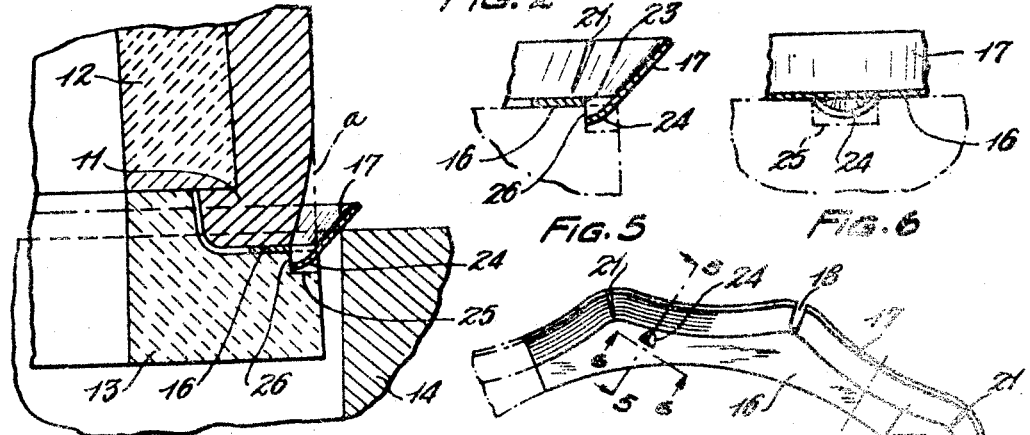
Figure 8:
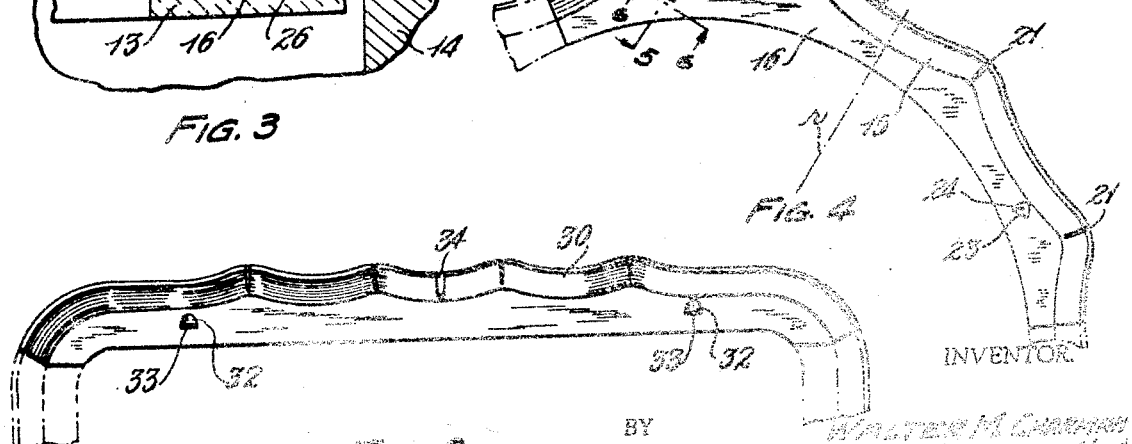

UNITED STATES PATENT OFFICE 2,258,480

DIAMOND WORKING PROCESS

Alfred Bergmann, Berlin, Walther Dawihl, Kohlhasenbruck, Post Neubabelsberg, and Otto Fritsch, Berlin-Johannisthal, Germany, assignors to General Electric Company, a corporation of New York Application November 21, 1938, Serial No. 241,708
In Germany December 17, 1937

2 Claims. (Cl. 125—30)

Our invention relates to a method and apparatus for forming cavities or holes in difficultly workable materials such as diamonds.

Heretofore, it has been the practice to produce cavities or holes in diamonds by rotating a diamond and pressing thereagainst a diamond point or a steel mandrel coated with diamond dust. It is an object of our invention to produce cavities or holes in diamonds or similar materials in a much shorter time than heretofore and to effect an economy of diamond points and diamond dust by means of an electrical process without, however, incurring a "shedding" of the diamonds such as usually occurs when the diamond is clamped between a pair of electrodes and an electrical arc is struck therethrough. The diamond in that case usually fractures and shows large flaws after the electrical piercing.

According to our invention, the diamond is immersed in a conducting liquid between a pair of electrodes one of which extends into the liquid but is spaced from the diamond and the other of which is needle-shaped and extends into the liquid but in contact with the diamond, an electrical current then being passed between the electrodes. The voltage between the electrodes is so selected that a spark-like discharge occurs at the point of contact between the needle-shaped electrode and the diamond. Due to the discharge, the diamond is uniformly worn away in a much shorter time than that necessary for the mechanical drilling of diamonds. Further features and advantages of our invention will appear from the following detailed description and from the drawing.

The drawing is an elevation, partly in section, of apparatus which may be employed in practicing the method comprising our invention.

Referring to the drawing, the apparatus comprises a receptacle or container 1 preferably made of glass or quartz and having on the bottom thereof a layer 2 of lead or other soft material in which the diamond 3 to be worked is pressed. The receptacle contains a liquid 4 which may be, for example, dilute sulphuric acid, caustic soda or salt solution. There is sufficient liquid to completely cover the diamond. An electrode 5 extends into the liquid but is spaced from the diamond 3 and from the bottom layer 2. The said electrode 5 is made of a material which is not attacked by the liquid 4, preferably a material such as platinum or a platinum iridium alloy. A needle-shaped electrode 6 is slidably mounted in a guide member 7 above the diamond 3 and is pressed thereagainst by a weight or spring not shown in the drawing.

When a voltage is impressed between the electrodes 5 and 6 so that a current flow is produced, there is observed at a certain voltage, for example 40 volts, a strong decrease of the current strength and at the same time the formation of a spark-like discharge between the needle point and the diamond which causes a drilling of the diamond. If the voltage is too small, there is only an electrolytic decomposition of the liquid 4 with no drilling or wearing away of the diamond. At extremely high voltages, this electrolysis disappears in favor of the above mentioned spark formation and at the same time the liquid in the neighborhood of the needle point is pressed away so as to form a concave meniscus as shown by the dotted line 8, so that the point of the needle is periodically exposed.

The form of the concavity or hole is determined by the value of the voltage. At high voltages (80 and over), a cylindrical hole is obtained, while at lower voltages (40 to 60 volts), a conical hole is obtained.

The speed of drilling varies according to the characteristics of the diamond and the electrolyte and also according to the voltage. Direct or alternating current may be used in the process.

Since the spark-like discharge used in our process drills the object being worked in a mechanical manner, and since the perforation does not depend upon oxidation of the object, the new process may be advantageously used to produce holes or cavities in other difficultly workable materials such, for example, as "Korund" or porcelain.

What we claim as new and desire to secure by Letters Patent of the United States is:

1. The method of forming cavities in diamonds or similar difficultly workable materials which comprises inserting the diamond under the surface of a solution of electrolyte which is liquid at room temperature between a pair of electrodes extending into the electrolyte, one of which electrodes is spaced from the diamond and the other of which is in contact therewith, and passing an electrical current between said electrodes at such a voltage that a spark-like discharge is produced at the point of contact between the diamond and the electrode in contact therewith, which discharge causes the drilling of a cavity in the diamond.

2. The method of forming cavities in diamonds or similar difficultly workable materials which comprises inserting the diamond under the sur- Oct. 7, 1941.  W. M. CHARMAN  2,258,483

HOT TOP

Filed Nov. 14, 1940

INVENTOR
BY
ATTORNEYS